(12) United States Patent
Baek

(10) Patent No.: US 7,344,479 B2
(45) Date of Patent: Mar. 18, 2008

(54) ELECTROMAGNETIC CLUTCH FOR MANUAL TRANSMISSION

(76) Inventor: Jung Ho Baek, 105-205, Samsung Green Core 1095-2, Gupo-Dong, Buk-gu, Pusan-shi 616-090 (KR)

( * ) Notice: Subject to any disclaimer, the term of this patent is extended or adjusted under 35 U.S.C. 154(b) by 38 days.

(21) Appl. No.: 11/132,141

(22) Filed: May 18, 2005

(65) Prior Publication Data

US 2006/0135313 A1 Jun. 22, 2006

(30) Foreign Application Priority Data

Dec. 21, 2004 (KR) .................. 10-2004-0109766

(51) Int. Cl.
*B60W 10/02* (2006.01)
*B60W 10/06* (2006.01)
*F16D 27/02* (2006.01)
*F16D 27/12* (2006.01)
*F16D 47/00* (2006.01)

(52) U.S. Cl. .................. 477/179; 192/84.31; 192/84.8; 192/48.2

(58) Field of Classification Search .............. 192/48.2, 192/84.31, 84.8; 310/78, 103
See application file for complete search history.

(56) References Cited

U.S. PATENT DOCUMENTS

| 892,868 A | * | 7/1908 | Morse | 192/84.2 |
|---|---|---|---|---|
| 3,943,391 A | * | 3/1976 | Fehr | 310/103 |
| 5,131,294 A | * | 7/1992 | Yoshimura | 477/109 |
| 5,971,121 A | * | 10/1999 | Pardee | 192/18 B |
| 2002/0186647 A1 | * | 12/2002 | Her et al. | 369/266 |
| 2004/0066107 A1 | * | 4/2004 | Gery | 310/103 |
| 2005/0137054 A1 | * | 6/2005 | Yu | 477/109 |

FOREIGN PATENT DOCUMENTS

JP 2004-232835 8/2004

\* cited by examiner

*Primary Examiner*—Sherry Estremsky
*Assistant Examiner*—Edwin A Young
(74) *Attorney, Agent, or Firm*—Mayer & Williams PC; Stuart H. Mayer, Esq.; Karin L. Williams, Esq.

(57) ABSTRACT

An electromagnetic clutch selectively transferring engine power for a manual transmission includes a stator fixedly connected to an engine crankshaft via a flywheel, having an electromagnet and a lining drum, a clutch rotor for transmitting the engine power to a transmission power shaft by means of the magnetic force of the stator, a lining selectively contacting or releasing the lining drum of the stator, and a lining arm being rotated so that an end portion thereof presses the lining to the lining drum for physical contact between the lining and the lining drum.

9 Claims, 5 Drawing Sheets

PRIOR ART

ELECTROMAGNETIC CLUTCH FOR MANUAL TRANSMISSION

BACKGROUND OF THE INVENTION

1. Field of the Invention

The present invention relates to an electromagnetic clutch for a manual transmission, in which the engine power is temporarily interrupted during the course of speed change through the transmission when the engine power is transmitted to the driving wheel through the clutch and the transmission. More specifically, the invention relates to an electromagnetic clutch for a manual transmission, in which the structure thereof is improved in order to more certainly transmit the power, the impact caused by the speed change can be minimized, thereby improving the service lifespan thereof, along with the economical efficiency and safety.

2. Background of the Related Art

In the conventional manual transmission mode, the speed change is carried out by operating a gear lever with the clutch pedal stepped on. Therefore, a driver suffers from an inconvenience of having to continuously and manually perform the speed change depending on the speed, when traveling.

Accordingly, in order to promote the convenience for drivers, various automatic transmission techniques have been recently developed, in which the speed change of the car is automatically carried out by a mechanism. However, it cannot be a complete solution therefor, in terms of the advantages of the vehicle adopting the conventional manual transmission, such as the cost, the weight, the rate of fuel consumption and the acceleration performance.

As one approach in order to solve the above problems, Japanese patent Laid-open Publication No. Pyung16-232835 discloses an automatic clutch, in which an electromagnetic 59 is adopted, while using the conventional manual transmission mode. As shown in FIG. 1, the above automatic clutch 1 includes an electromagnet 59 fixedly attached thereto, an armature 61 corresponding to the electromagnet 61, a friction clutch 63 integrally formed with the armature, which moves by the magnetic force of the electromagnet.

The convention technique having the above-described construction is configured in such a manner that the armature is drawn by the magnetic force of the electromagnet, plural friction clutches are contacted with one another and rotated by the movement of the armature, thereby selectively transmitting the engine power to the transmission.

However, the above-mentioned conventional electromagnetic clutch device embraces several problems. For example, the contact and rotation of the friction clutch relies on the frictional force by the magnetic force of the electromagnet only, so that the power transmission cannot be adequately performed. Therefore, at the time point of starting or speed-changing, the impact caused by the speed change is overly generated, thereby inducing discomfort to the driver, along with the excessive fuel consumption and the complexity of structure therefore.

SUMMARY OF THE INVENTION

Therefore, the present invention has been made in view of the above problems occurring in the prior art, and it is an object of the present invention to provide an electromagnetic clutch for a manual transmission, in which the structure thereof is improved in order to more certainly transmit the power, the impact caused by the speed change can be minimized, thereby improving the service life thereof, along with the economical efficiency and safety.

To accomplish the above object, according to one embodiment of the present invention, there is provided an electromagnetic clutch for a manual transmission, which is to be connected to an automatic transmission for automatically transmitting of engine power. The electromagnetic clutch of the invention comprises a stator connected to an engine crankshaft via a flywheel for exerting a magnetic force, a clutch rotor for transmitting the power of the engine crankshaft to a transmission power shaft by means of the magnetic force of the stator, a lining capable of closely contacting to or releasing from the stator, and a lining arm being rotated by an arm operating means inside the lining so as to closely contact or release the lining.

The stator is connected to the flywheel formed at one end of the engine crankshaft connected to an engine, an electromagnet supplied with an electric power is connected to the outer periphery of the stator, a lining drum is projectedly formed in opened side of the stator, and a bearing is formed between one side of the inside of the stator and one side of the clutch rotor.

The circumferential end portion of the clutch rotor is projected towards stator between the inner side of the electromagnet position and the outer side of the lining drum, and the central shaft of the clutch rotor is coupled with the transmission power shaft.

The lining is formed of an upper and lower semi-circular members which are spaced apart and form a circular lining, the width of each semi-circular member becomes gradually wider from one end towards the other end thereof, and the end portions of the thinner width side are to one side of the clutch rotor by a lining pin, and both sides of the wider width side are connected by resilient means.

The lining arm is formed inside the lining in such a way that it can be rotated by an arm operating means, the central shaft thereof is formed with a bearing inserted outside of the clutch rotor.

The electromagnet is contacted with a power supply roller so as to be supplied with an electric power while rotating.

The stator is provided with a rotation-detecting sensor mounted on a side of transmission housing for detecting whether the stator rotates.

The stator is supplied with an electric power in such a way that the intensity of the power is gradually increased in a three-step pattern.

A permanent magnet is formed in the outer circumference of the clutch rotor in order to thereby certainly transmit engine power to a transmission.

The lining arm is provided with a position-detecting sensor attached to the end portion thereof so that the lining arm is moved according to the engine speed and the close contact and release of the lining arm is detected.

Right before the lining arm is operated after a speed change, fuel is cut off by a fuel cut-off signal of the engine control unit(ECU).

The automatic transmission is provided with two ring-shaped transferring devices having a connection plate with a rectangular opening formed therein, a fixing pin of a selector lever is connected to one rectangular opening so as to be able to pivot and move, another fixing pin of the shift lever is connected to the other rectangular opening so as to be able to pivot and move, the transferring device is provided with a transferring means formed in the inner circumference of the transferring device and the outer circumference of a first and second shaft so as to be able to move according to the rotation of the first and second shafts, and a post, to which a motor having the first and second shafts is installed, is fixed to the outside of the transmission case.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The preferred embodiments of the invention will be hereafter described in detail, with reference to the accompanying drawings.

Figure 1:
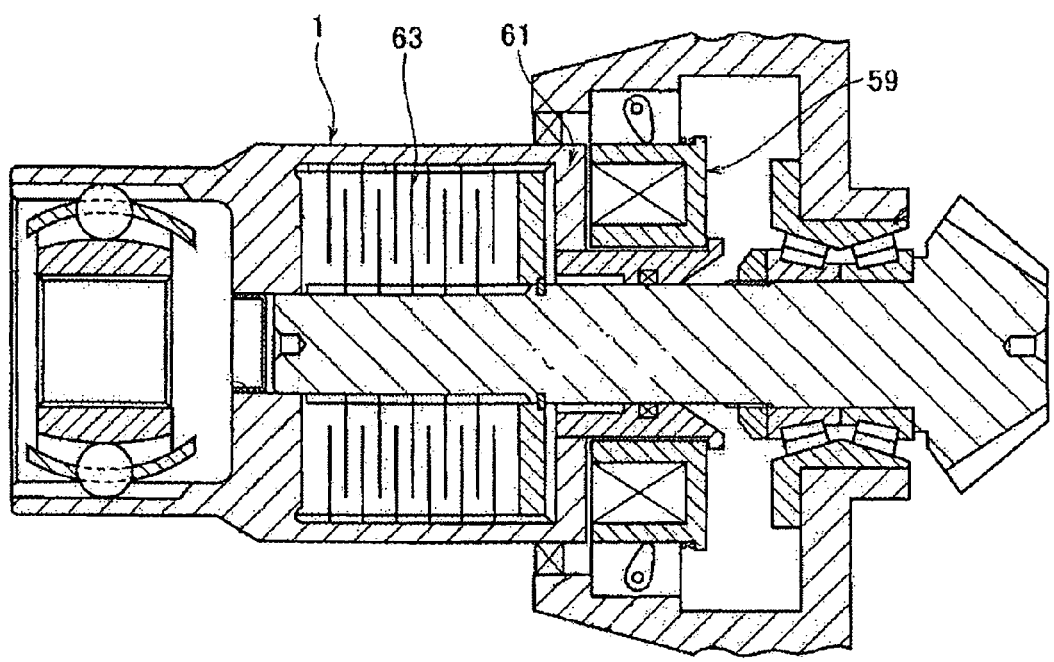
FIG. 1 is a cross-section showing a conventional electromagnetic clutch.
Figure 2:
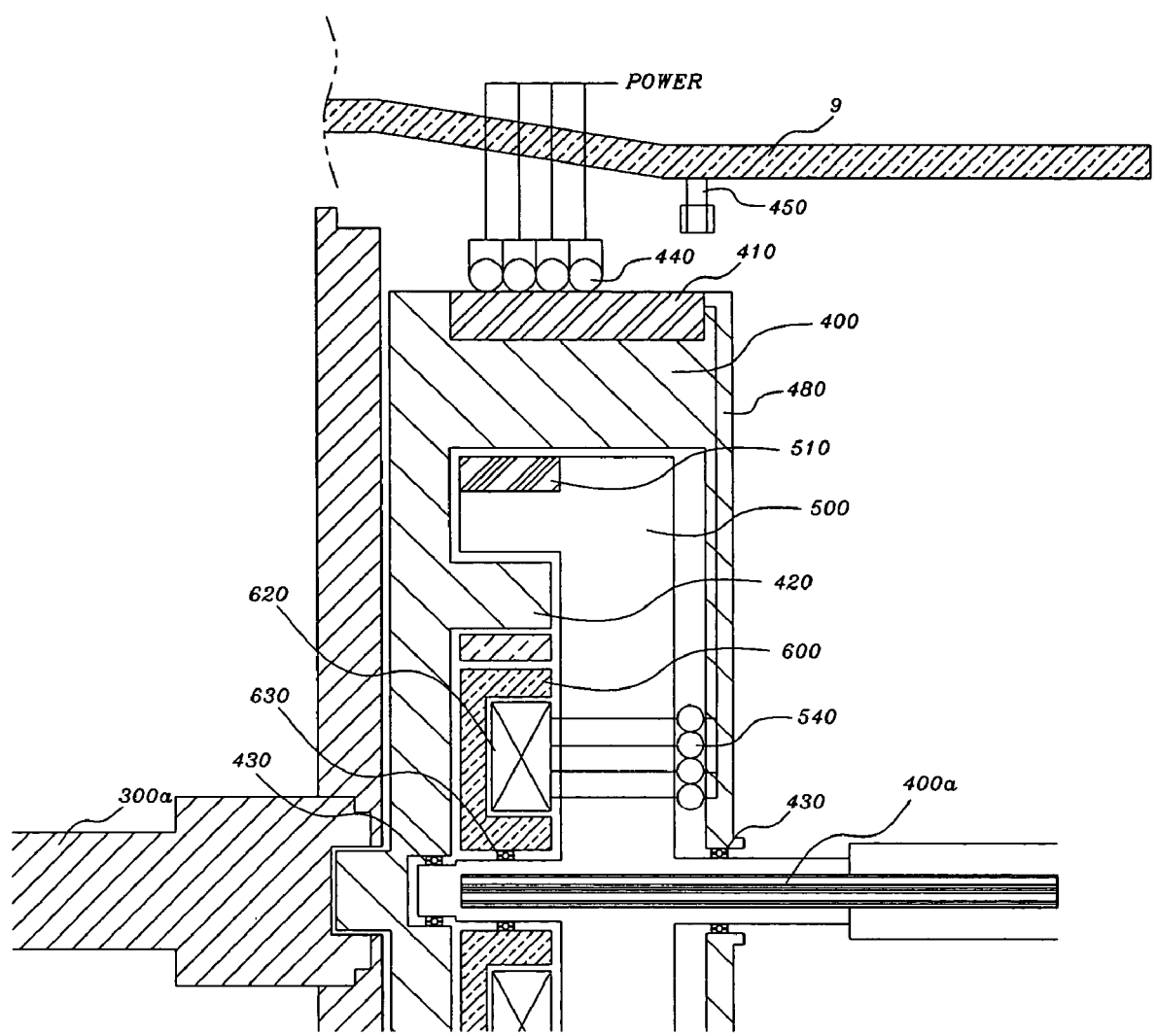
FIG. 2 illustrates a cross-section of an electromagnetic clutch for a manual transmission according to one embodiment of the invention.
Figure 3:
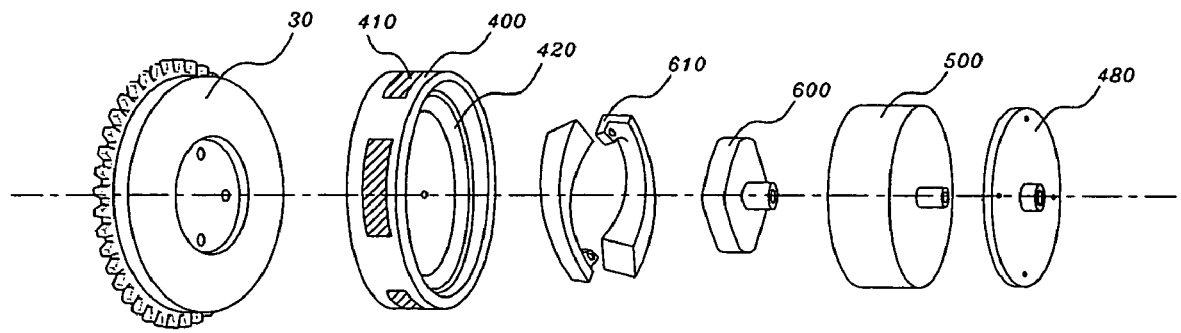
FIG. 3 is an exploded perspective view according to FIG. 2 showing the electromagnetic clutch for a manual transmission of the invention.
Figure 4:
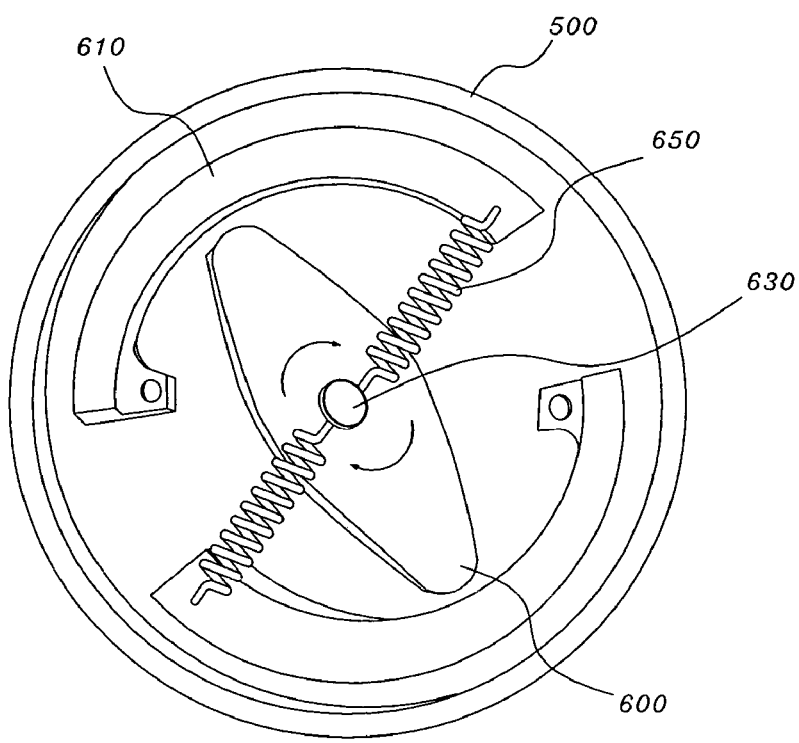
FIG. 4 is a partial enlarged view of FIG. 3 showing a connection of the lining with the lining arm.
Figure 5:
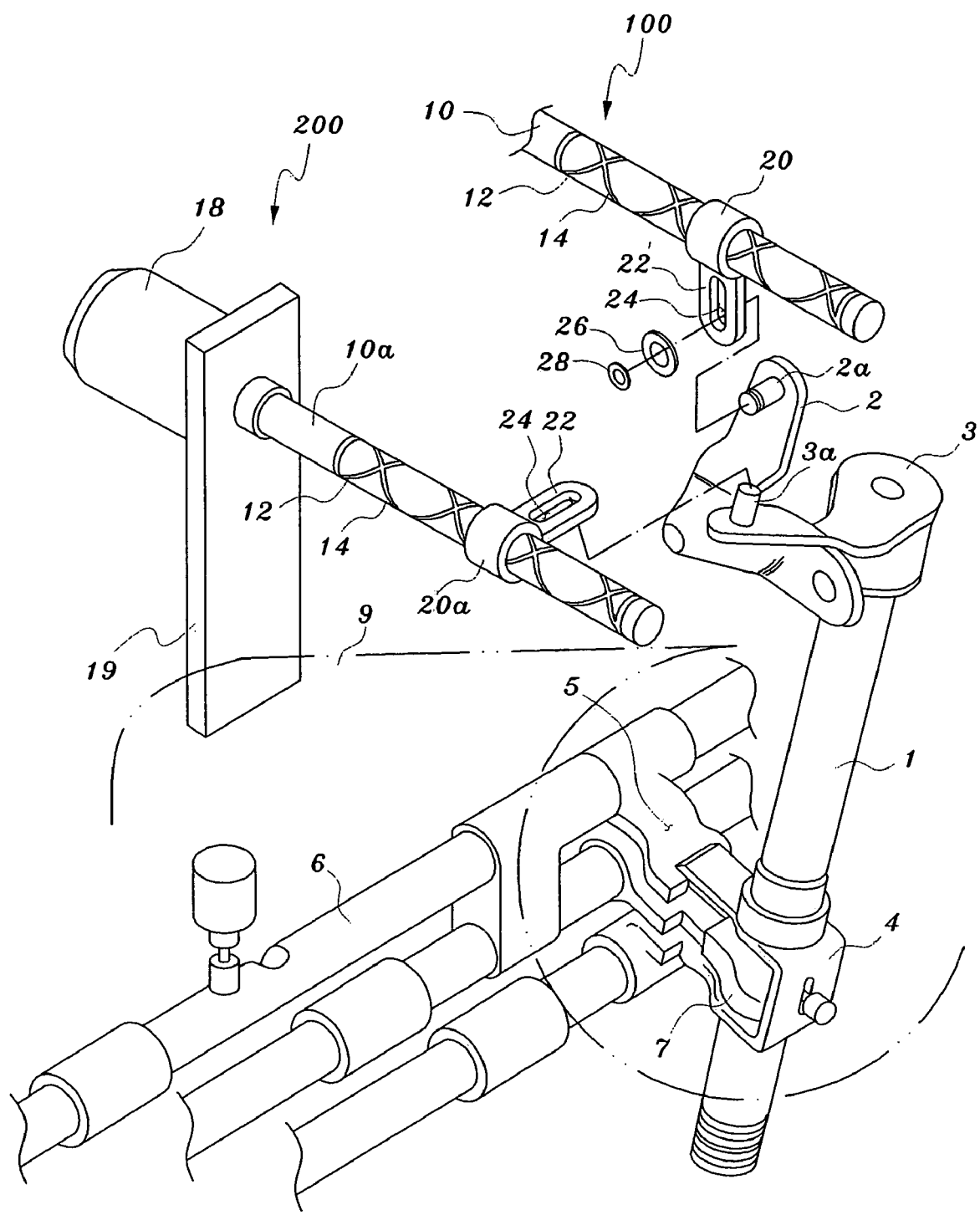
FIG. 5 is an exploded perspective view of an automatic transmission to be connected to the electromagnetic clutch for a manual transmission of the invention.
Figure 6:
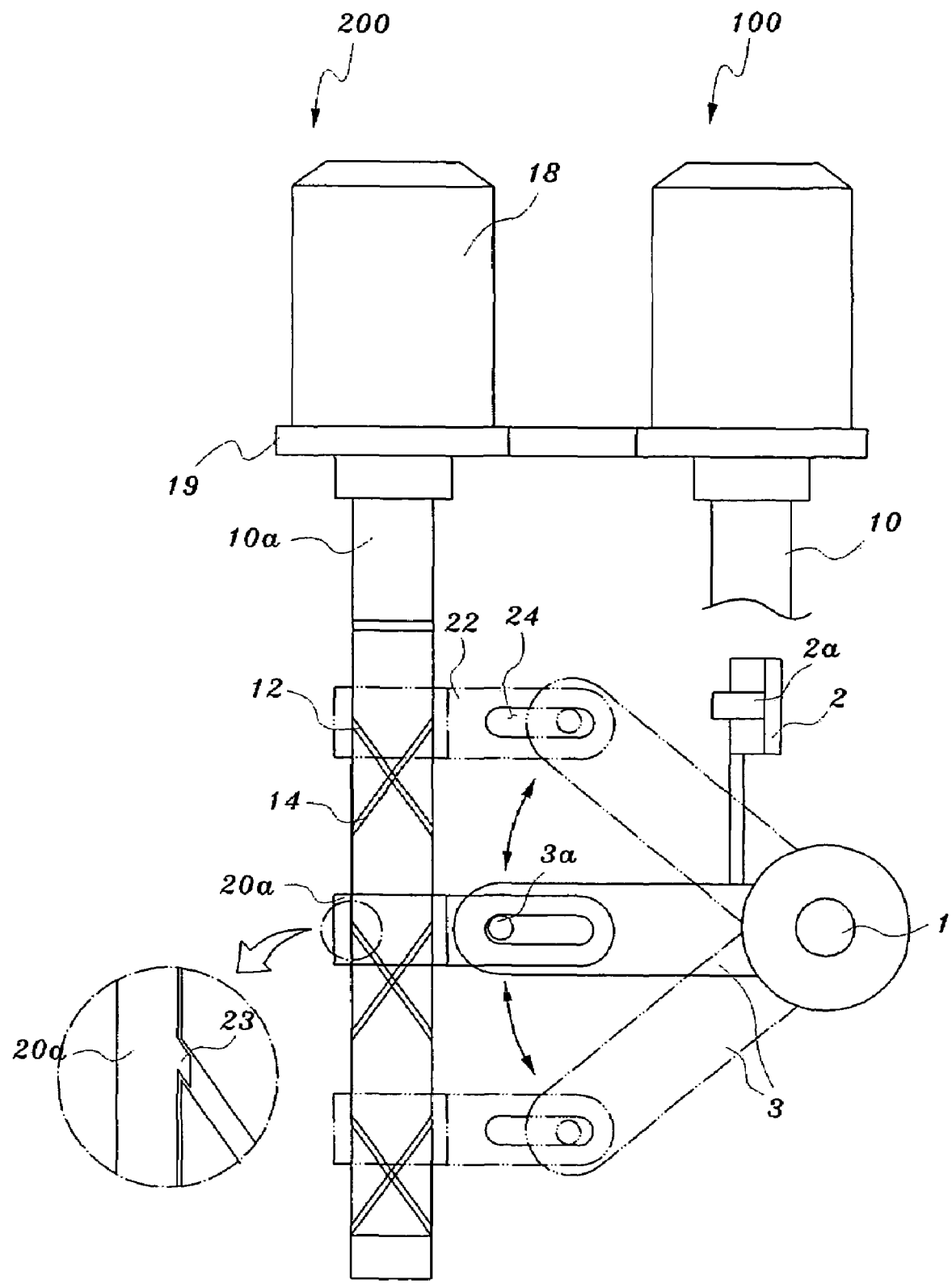
FIG. 6 is a cross-sectional view of an automatic transmission to be connected to the electromagnetic clutch for a manual transmission of the invention.

FIG. 2 illustrates a cross-section of an electromagnetic clutch for a manual transmission according to one embodiment of the invention. FIG. 3 is a deal drawing according to FIG. 2 showing each part of the electromagnetic clutch for a manual transmission of the invention. FIG. 4 is a partial enlarged view of FIG. 3 showing a connection of the lining with the lining arm. FIG. 5 is an exploded perspective view of an automatic transmission to be connected to the electromagnetic clutch for a manual transmission of the invention. FIG. 6 is a cross-sectional view of an automatic shifting/selecting device to be connected to the electromagnetic clutch for a manual transmission of the invention.

As shown in the drawings, the electromagnetic clutch of a manual transmission of the invention automatically transmits or interrupts power according to the running state or travelling conditions. The electromagnetic clutch of the invention is to be linked to an automatic shifting/selecting device for automatically operating a selector lever and a shift lever installed in a control shaft.

In other words, the power transmitted from the engine is transmitted to a driving wheel via a clutch and a transmission. When a speed change through the transmission is carried out, the clutch is used in order to temporarily interrupt the power transmission of the engine power.

The constitution of the electromagnetic clutch for a manual transmission of the invention will be described below. A stator 400 is integrally formed with a flywheel 300 by means of a bolt joint. The flywheel 300 is formed at one end of an engine crankshaft 300a of the engine. The power of the engine is transmitted according to whether a clutch rotor 500 integrally formed with a transmission power shaft 400a is joined with the stator 400 by means of an electromagnet 410. That is, if the stator 400 is joined with the clutch rotor 500, the engine power is transmitted to the transmission power shaft 400a. Otherwise, the engine power is not transmitted to the transmission power shaft 400a.

A lining 610 is disposed on an inner side of a lining drum 420 of the stator. If the end portion of the lining arm 600 inside of the lining 610 is closely contacted with the lining 610, the engine power is transmitted. Otherwise, the power is not transmitted.

Therefore, the electromagnetic clutch of the invention is connected to the flywheel 300, which is integrally formed with one end of the engine crankshaft 300a of the engine. Among the constitutional members of the clutch, the stator 400 has a cylindrical shape of which one side is open.

At the same time, the electromagnet 410 is connected to the outer peripheral face of the stator 400. As shown in FIG. 2 and FIG. 3, the electric power supplied to the electromagnet 410 is supplied through a power-supplying roller 440, which is contacted with the electromagnet 410. This is because, while the engine power is transmitted, the stator 400 having the electromagnet 410 installed therein is rotated together with the engine crankshaft 300a and the transmission power shaft 400a.

In addition, inwards of the stator 400 with the electromagnet 410 installed therein, a lining drum 420 is projected and formed inside thereof, with a certain space in-between where a clutch rotor 500 is disposed. The clutch rotor 500 will be hereinafter explained. Two bearings 430 are installed respectively in one side between one side of the inside of stator and the other side of the clutch rotor, and in other side between a stator cover 480 and the rotor clutch 500, thereby enabling the rotation of the transmission power shaft 400a without connection to crank shaft.

The end portion of a clutch rotor 500 having a disk shape is projected in such a way that the projected portion is placed between the inner side of the electromagnet 410 and the outer sides of the lining drum 420. The central shaft of the clutch rotor is integrally formed with the transmission power shaft 400a.

In addition, as illustrated in FIGS. 3 and 4, the lining 610 disposed inside of the lining drum 420 is installed on one side of the clutch rotor 500, and is composed of an upper and lower semi-circle. The width of each semi-circle becomes gradually wider from one end towards the other end thereof. The upper and lower semi-circle is spaced apart and together forms a circle in such a manner that the thinner width side of one semi-circle is faced with the thicker width side of the other semi-circle, and also the thicker width side of one semi-circle faces the thinner width side of the other semi-circle. Here, the end portion of the thinner width side of the lining is attached to one side of the clutch rotor by means of a lining pin 611, and both sides of the wider width side are connected by resilient means 650.

A lining arm 600 is installed inside of the lining 610 so as to be rotated by an arm operating means 620. The arm operating means, in other words, motor stator is attached to the clutch rotor 500 where the electric power is supplied through roller 540, and thus drives lining arm 600 integrally formed with motor rotor armature. The previously described electric power is supplied through a power-supplying roller 440 into electromagnetic clutch, and in sequence supplied to the arm operating means through electric wire installed in the stator cover 480 and roller 540. The central shaft of the lining arm 600 is connected with the outer side of the clutch rotor 500 in such a manner that a bearing 630 is installed inside so as to be rotated.

Simultaneously, the thicker width side of the lining 610 is connected by a resilient means 650 to both sides of the lining arm 600, which are near the thicker width side of the lining 610. Here, the resilient means 650 is preferred to be a spring, but any other means may be employed as long as they can restore the lining arm 600 rotated by the arm operating means.

Preferably, the clutch rotor 500 is provided with a permanent magnet 510 at the outer circumference thereof such that the inner side of the stator 400 can be magnetically coupled for rotation with the outer side of the clutch rotor 500 so as to transmit the engine power to the power transmission. The permanent magnet is for reinforcing the joining force between the stator and the rotor by the electromagnetic force.

In addition, when an electric power is supplied to the stator 400, it is supplied in a three-step way in such a manner that the intensity of the electric power is gradually increased, thereby minimizing the impact caused by the speed change. Furthermore, the lining arm 600 is provided with a position-detecting sensor 660 attached to the end portion thereof. The position detecting sensor 660 functions to move the lining arm 600 according to the engine speed and determine whether the lining is contacted to the lining drum. The transmission housing 9 is provided with a rotation-detecting sensor 450 attached to one side thereof so that it detects whether the stator 400 rotates and the rotation timing of the lining arm 600 can be determined.

At the same time, while running, the lining arm is released from the inside of the lining and the speed change is performed. Right after that, before the lining arm is again closely contacted to the inside of the lining, the engine control unit (ECU) sends a fuel cut-off signal for around 0.5 second, in order to alleviate the impact of speed change and simultaneously save fuel. That is, the control module (TCM, not illustrated) of the electromagnetic clutch for a manual transmission of the invention sends a signal to the engine control unit. Here, the control module is a device that receives signals from various sensors mounted on the transmission of the invention and sends a control command to the operating unit such as a motor. The control module mounted on the engine control unit and the transmission is a central control unit, which is commonly applied in the automobile field, and thus details thereon will not be described here.

On the other hand, in connection with the electromagnetic clutch for a manual transmission according to the invention, an automatic shifting/selecting device for transmitting the engine power commonly includes an interlock plate 4 for preventing the double connection of a gear, a control finger 7 disposed inwards of the interlock plate, a shift lug 5 engaged with the control finger and operated together, and a shift rail 6 to which the shift lug is fixed. A control shaft 1 assembled to the interlock plate is exposed outside of a housing 9 of the transmission.

The control shaft is provided, at the outside end portion thereof, with a selector lever 2 for moving upwards and downwards the control shaft and a shift lever 3 for pivoting the control finger.

Therefore, when performing a manual change of speed, the engine power is interrupted by the clutch, then a gear shaft to be connected is selected by the selector lever, and the control finger is turned to determine a gear level.

In other words, according to the invention, an operating apparatus for automatically operating the selector lever 2 and the shift lever 3 is provided, without using a gear shifting lever and a cable.

First, in the housing of the transmission, a desired post 19 is installed at the position near the control shaft 1. Two motors 18 are installed at the same side of the post, and a first shaft 10 and a second shaft 10a are formed in parallel as the rotating shaft of the motors. Here, the first shaft 10 is for operating the selector lever 2 and the second shaft 10a is for operating the shift lever 3.

Here, the first and second shafts driven by the motors are provided with a transferring means at the outer peripheral face thereof for a forward and backward transferring. As the transferring means, a spiral forward guide groove 12 is formed in the first shaft 10 in the advancing direction, and a spiral backward guide groove 14 is formed in the second shaft 10a in the retreating direction.

In addition, a transferring device 20, 20a having a transferring projection 23 is provided inwards thereof as the transferring means. The forward and backward guide grooves 12 and 14 in the first and second shaft are engaged respectively with the transferring projection 23, which is to move along the forward and backward guide grooves 12 and 14.

The transferring device 20, 20a is provided with a connection plate 22 attached outside thereof. At the center of the connection pate 22 is formed a rectangular opening 24 such that a fixing pin 2a, 3a provided in the selector lever and the shift lever can be moved snugly when the selector lever 3 or the shift lever 3 rotates.

As described above, the transferring device 20 assembled to the first shaft 10 is assembled to the selector lever 2 of the control shaft to thereby constitute a selector lever operating unit 100. The selector lever operating unit 100 functions to vertically move the control shaft by pivoting the selector lever 2 when the first shaft is rotated by the motor.

In addition, the transferring device 20a assembled to the second shaft 10a is assembled to the shift lever 2 to thereby constitute a shift lever operating unit 200. The shift lever operating unit 200 functions to rotate the control shaft through the shaft lever when the second shaft is rotated by the motor.

As described previously, each transferring device 20, 20a has the rectangular opening 24 so that the fixing pin 2a, 3a provided in the selector lever 2 and the shift lever 3 can be snugly fixed.

That is, both fixing pins 2a, 3a are inserted into each rectangular opening 24 and fixed by an appropriate washer 26 and a fastener 28 such as a snap ring or bolt. Therefore, the fixing pin 2a, 3a can be moved vertically and horizontally along the rectangular opening, so that a gap is maintained so as to accept the deviation in the center distance when the selector lever 2 and the shift lever 3 are operated.

On the other hand, each motor of the selector lever operating unit 100 and the shift lever-operating unit 200 is connected so as to be supplied with an electric power from the battery of the car. A control unit (not illustrated) is provided for operating the selector lever operating unit and the shift lever-operating unit, depending on the running conditions. The control of the automatic shifting/selecting device according to the traveling conditions is well known to those skilled in the art and thus details thereon will not be described here.

The operation of the electromagnetic clutch for a manual transmission having the above construction will be hereafter described.

In case where the driver starts the engine and shifts into a first level forward gear with the brake pedal stepped on, when the driver releases slowly the brake pedal, the engine power remains transmitted and soon the stator 400 is rotated by being attracted by the permanent magnet 510 and receiving the rotating power of the engine.

In addition, the electromagnet 410 is supplied with an electric power via the power supplying roller 440 connected to a power supply. The stator 400 attracted by the electromagnet 410 is rotated as the engine rotates.

At this time, when the electric power is supplied to the electromagnet 410, the electric power is supplied in a three-step way in such a manner that the intensity of power is gradually increased, thereby alleviating the impact, which may be abruptly occurred due to the power transmission. For example, a weak voltage is supplied for the first 0~0.5 seconds, an intermediate voltage is supplied between 0.5 and 1.0 second, and a strong voltage is supplied between 1.0 and 1.5 second.

If the rotating power of the engine is transmitted to the stator 400 by the attractive force of the electromagnet 410 and the stator 400 starts to rotate, the rotation-detecting sensor 450 detects the rotation of the stator 400 and sends a signal to the control unit (not illustrated) before the driver steps on the accelerating pedal.

At the same time, the control unit supplies an electric power to the arm operating means and cuts off the electric power being supplied to the electromagnet 410. The arm operating means being supplied with the electric power rotates, and thus the lining arm 600 is rotated counterclockwise (in FIG. 4) through the worm gear 640, and the end portion of the lining arm 600 is closely contacted towards the thicker width side of both linings 610.

At this time, if the position-detecting sensor 660 detects that the end portion of the lining arm 600 is closely contacted to the inner side of the lining 610 and sends a signal to the control unit, the control unit cuts off the power supply to the arm operating means 620.

Therefore, as the lining arm 600 is tightly contacted with the inner side of the lining 610, the engine crankshaft 300a, the flywheel 300, the stator 400, the lining 610, the lining arm 600, the clutch rotor 500 and the transmission power shaft 300a are integrally connected such that the rotating power of the engine is transmitted to the transmission power shaft 400a along the engine crankshaft 300a. Here, the lining is connected to the clutch rotor by means of the lining pin, thereby transmitting the power.

On the other hand, when the speed change is required, the electric power is supplied by a signal of the control unit. If the electric power with an opposite pole is supplied, the arm operating means drives the lining arm 600 in the opposite direction and thus the lining arm 600 is turned clockwise (in FIG. 4), so that the clockwise rotated state of the lining arm 600 is fixed by means of the restoring force of the resilient means 650 and thus the stator 400 and the lining 610 are loosened, thereby interrupting the engine power.

At the same time, when running, right after the lining arm is released from the inner side of the lining and a speed change is performed, until right before the lining arm is again closely contacted to the inner side of the lining, for around 0.5 second, the control unit sends a fuel cut-off signal to the engine every time of the speed change in order to save fuel while alleviating the impact due to the speed change.

Therefore, while the power to the transmission power shaft 400a is cut off, if the speed change is carried out by the signal from the control unit, again the arm operating means is supplied with an electric power by the signal of the control unit, so that the lining arm 600 makes the lining 610 be closely contacted, and thus integrated with the stator 400, thereby transmitting the power to the transmission power shaft 400a.

On the other hand, when the speed of car is increased or decreased by means of the accelerating pedal, the control unit sends to each operating unit an electrical signal appropriate to the changed speed and resultantly each operating motor drives to move the lever.

That is, the first shaft 10 rotates to thereby move the transferring device so that the selector lever 2 is pivoted upwards and downwards. Therefore, through the control shaft 1 the control finger 7 selects the first level-second level, or the third level-fourth level or the fifth level-backward shift lug 5 among the three shift lugs 5 positioned at the upper, intermediate and lower place thereof. As the second shaft rotates, if the control shaft is turned right and left through the shift lever 3, the control finger moves the shift lug 5 horizontally right and left, i.e., to the first level or second level in the first level-second level, to the third level or the fourth level and the neutral level in the third level-fourth level, and the fifth level or backward level in the fifth level-backward level.

Thereafter, since the shift lug is fixed to the shift rail 6 together with a shift fork (not illustrated), consequently the fork moves a synchronizer and a sleeve to thereby perform the speed change.

As described above, the electromagnetic clutch for a manual transmission according to the invention is constructed in a two-step connection in such a way that the stator and the clutch rotor are connected and rotated by a magnetic force and thus the lining arm is closely contacted to the lining. Therefore, the power transferring from the engine to the transmission is carried out through a gradual increase in the electromagnetic force and the mechanical frictional force, so that the impact at the start or at the speed change can be significantly alleviated, along with the fuel reduction and extension in its service life.

Therefore, the electromagnetic clutch for a manual transmission of the invention provides the convenience of an automatic transmission, and also the advantages of the conventional manual transmission such as the economical efficiency therefor and the responsiveness for speed changes.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An electromagnetic clutch for a manual transmission, which is to be connected to an automatic shifting/selecting device for automatically transmitting engine power, the electromagnetic clutch comprising:
 a) a stator formed in a cylinderical shape with and fixedly connected to an engine crankshaft via a flywheel, having an electromagnet supplied with an electric power and fixedly connected to the outer periphery of the stator, and a lining drum protrudedly formed in the open side of the stator;
 b) a clutch rotor for transmitting the engine power to a transmission power shaft by means of the magnetic force of the stator;
 c) a lining selectively connecting the clutch rotor and the stator by contacting or releasing the lining drum of the stator, the lining pivotally attached on one side of the clutch rotor and selectively being in contact with the lining drum; and
 d) a lining arm being rotated by an arm operating means so that the end portion thereof presses the lining to the lining drum for physical contact between the lining and the lining drum.

2. The electromagnetic clutch according to claim 1, wherein a circumferential end portion of the clutch rotor is protruded towards the stator between an inner side of the electromagnet position and an outer side of the lining drum, and a central shaft of the clutch rotor is coupled with the transmission power shaft.

3. The electromagnetic clutch according to claim 2, wherein a permanent magnet is formed in the outer periphery of the clutch rotor in order to thereby transmit engine power to the transmission power shaft.

4. The electromagnetic clutch according to claim 1, wherein the lining is formed of upper and lower semi-circular members which are spaced apart and form a circular lining, the width of each semi-circular member becoming gradually wider from one end towards the other end thereof, and the end portions of the thinner width side are pivotally attached to one side of the clutch rotor, and both sides of the wider width side are connected by resilient means.

5. The electromagnetic clutch according to claim 1, wherein the lining arm is formed inside the lining in such a way that the lining arm can be rotated by the arm operating means. a central shaft thereof is formed with a bearing inserted outside of the clutch rotor.

6. The electromagnetic clutch according to claim 1, wherein the electromagnet is contacted with a power supply roller so as to be supplied with the electric power while rotating.

7. The electromagnetic clutch according to claim 1, wherein the stator is provided with a rotation-detecting sensor mounted on a side of a transmission housing for detecting whether the stator rotates.

8. The electromagnetic clutch according to claim 1, wherein the stator is supplied with the electric power in such a way that the intensity of the power is gradually increased in a three-step pattern.

9. The electromagnetic clutch according to claim 1, wherein fuel for the engine is cut off by a fuel cut-off signal for the time duration from the moment that the lining arm is released from the lining to the moment that the lining arm is contacted to the lining for a speed change.

* * * * *